Sept. 23, 1969    A. A. ROBINSON ET AL    3,469,050
ARC ROTATING COIL STRUCTURE IN VACUUM CIRCUIT INTERRUPTERS
Filed Aug. 1, 1966    6 Sheets-Sheet 1

Alfred Alexander Robinson and
James William Calvesbert
INVENTORS

By Misegades and Douglas

United States Patent Office 3,469,050
Patented Sept. 23, 1969

3,469,050
ARC ROTATING COIL STRUCTURE IN VACUUM CIRCUIT INTERRUPTERS
Alfred Alexander Robinson and James William Calvesbert, Stafford, England, assignors to The English Electric Company, Strand, London, England, a British company
Filed Aug. 1, 1966, Ser. No. 569,265
Claims priority, application Great Britain, Aug. 6, 1965, 33,781/65; Sept. 1, 1965, 37,302/65; Sept. 9, 1965, 38,557/65
Int. Cl. H01h 9/30, 33/04
U.S. Cl. 200—144   21 Claims

ABSTRACT OF THE DISCLOSURE

One of the contact members of a vacuum circuit interrupter is mounted on a structural tube surrounded by a helical conductor. The major part of the current flows from the terminal to the contact member through the helical conductor, and the tube resists the loads on making of the contacts.

---

Preferably the contact members have contact annuli surrounded by arcing annuli and the current path between the helical conductor and the respective contact annulus extends radially inwards from the helical conductor and then radially outwards to the contact annulus, to provide a "current loop." The magnetic field associated with the current loop reacts with an arc struck between the contact annuli to move it outward to between the arcing annuli, and the magnetic field produced by current flowing in the helical conductor reacts with the arc to rotate it around the arcing annuli. The contact annuli are preferably formed of a sintered refractory material, e.g. tungsten, impregnated with a metal of high electrical conductivity, e.g. copper-zirconium alloy, and the arcing annuli are preferably formed of a metal of high electrical conductivity.

This invention relates to circuit interrupters.

According to this invention a vacuum circuit interrupter comprises an evacuated enclosure containing a pair of relatively movable contacts, and includes a generally circular conducting part which serves as, or is associated with, a first of said contacts and is mounted coaxially on one end of a structural tube surrounded by a substantially helical conducting coil which connects the conducting part electrically to a terminal outside the evacuated enclosure and preferably has a lower electrical impedance than the structural tube, whereby the magnetic field produced by current flowing in the helical conducting coil reacts with an arc struck from the conducting part after separation of the contacts to cause rotation of the arc around the axis of the conducting part.

A number of embodiments of the invention will now be described by way of example with reference to the accompanying drawings, of which:

Figure 1:
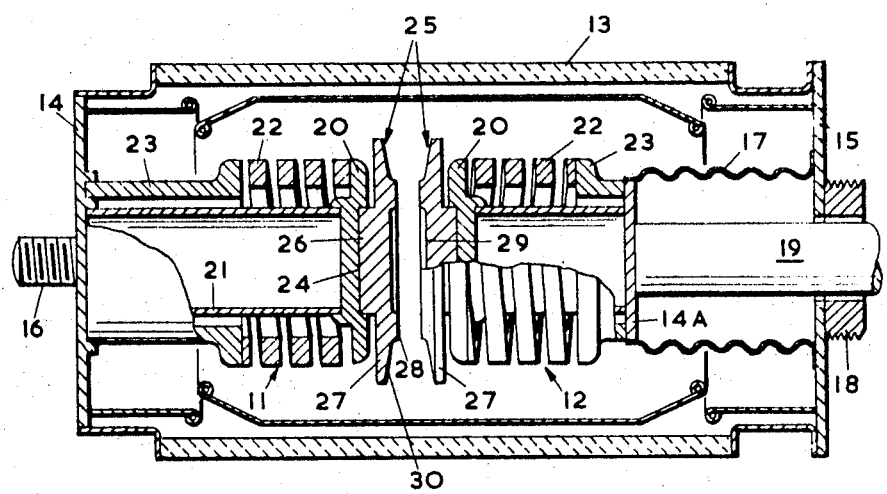
FIG. 1 is a sectional view of one embodiment of a circuit interrupter in accordance with the invention.

Referring now to FIG. 1, one embodiment of a vacuum circuit interrupter has a fixed contact 11 and a movable contact 12. The contacts are contained within an envelope having a cylindrical wall 13 of insulating material joined to a pair of end-plates 14, 15. The envelope is constructed to withstand a high vacuum. The fixed contact 11 is secured to the end-plate 14, which is provided with a terminal 16 by which the vacuum interrupter may be connected in a circuit, and the movable contact 12 is connected to the end-plate 15 by means of an expansible bellows 17, which permits axial movement of the contact. An annular terminal 18 is connected to end-plate 15, and an actuating rod 19 passes through this terminal and is connected to the movable contact 12 and may be electrically connected externally (by means not shown) to the terminal 18.

Apart from the features above described, the fixed contact 11 and movable contact 12 are similar to one another.

The vacuum interrupter may also be provided with shields to protect the envelope against the effect of arcs drawn between the contacts, such shields being well known in the art.

Each of the contacts 11, 12 includes a disc 20 of high-conductivity metal, e.g. copper, which is mounted coaxially on a tube 21 of a material of high mechanical strength and high electrical resistance such as stainless steel.

Each of the tubes 21 is coaxially surrounded by a coil 22 of high-conductivity material such as copper. One end of each coil 22 abuts a peripheral portion of the adjacent face of the corresponding disc 20. The coils 22 are wound in opposite directions so as to be magnetically in opposition to each other. The ends of the tubes 21 remote from the co-operating faces of the contacts are secured respectively to the base-plate 14 in the case of the fixed contact 11 and to a plate 14A in the case of the movable contact 12, and the corresponding ends of the coils 22 abut generally tubular conducting parts 23 of high-conductivity material, such as copper, which are secured in turn to the end-plate 14 or 14A.

The face of each disc 20 remote from the corresponding tube 21 and coil 22 is formed coaxially with circular recesses 24. The diameter of each circular recess 24 is approximately equal to that of the corresponding tube 21 and is, therefore, substantially less than the mean diameter of the corresponding coil 22.

Contact members 25 are each formed on one side with a circular projection 26 which spigots into the respective recess 24, and are each provided with a lateral flange 27 which is spaced away from the adjacent part of the corresponding disc 20. The flanges 27 are each formed coaxially with a contact annulus 28 which extends radially outwards from the projection 26. The annuli 28 of the co-operating contacts are of the same diameter and each surrounds a central depression 29. The portions of the flanges 27 outside the contact annuli diverge from one another in a radially outward direction and form arcing annuli 30.

Figures 2, 3:
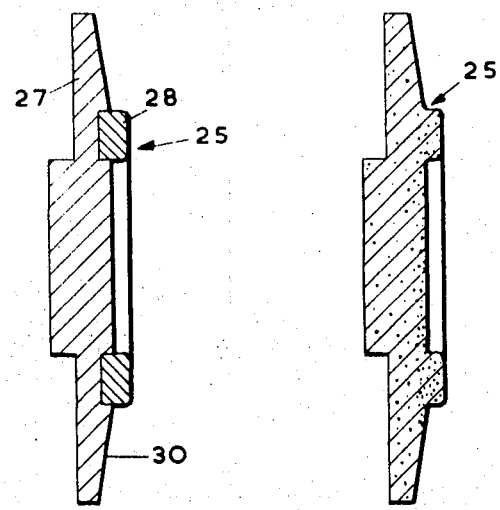
FIG. 2 is a detail on a larger scale of part of FIG. 1.
FIG. 3 illustrates a modification to the part of FIG. 1 shown in FIG. 2.

One construction of the contact members 25 is shown in FIG. 2, in which the contact annulus 28 is formed of a tungsten-copper-zirconium ring secured in a groove in the main body of the contact member 25, the main body being of copper-zirconium alloy. Alternatively a ring of a weld resistant or brittle alloy material may be used instead of the tungsten-copper-zirconium ring.

In the form of construction shown in FIG. 3 the contact member 25 is formed in one piece, the contact annulus having a high proportion of tungsten infiltrated with copper-zirconium alloy, and the remainder of the contact member having a low tungsten content, and a high copper-zirconium content. The latter construction of contact member may be formed by infiltrating a sintered tungsten compact with copper-zirconium alloy as described in commonly assigned application Ser. No. 448,219, filed Apr. 14, 1965, now Patent No. 3,379,846 issued Apr. 23, 1968. It will be appreciated that alternative refractory materials may be used in place of the tungsten.

In operation of this embodiment of the invention, the movable contact 12 is moved, by means of an external actuator connected to the rod 19, to bring the contact members 25 together, with their contact annuli 28 abutting. Contact annuli 28 made of the materials hereinbefore described are suitable for use in making and breaking a heavy-current circuit.

With the contacts 11, 12 closed, current flows between the terminals 18 and 16, flowing to or from the contact members 25, via the discs 20, the coils 22 and the tubular conducting parts 23. Since the coils 22 are wound in opposite directions to each other, the current flowing through the coils 22 causes a radial magnetic field to be produced in the region of the contact annuli 28, all the way around the contact annuli, the direction of the field from the two coils being the same so as to reinforce one another.

The tubes 21 are structural members which support the contact members 25 and the disc 20, thereby aligning the contact annuli 28 with each other so that they cooperate when the contacts 11, 12 are closed, and which withstand the compressive force exerted on each contact upon closure so as to indirectly support the coils 22 through the discs 20 thereby preventing compression of the coils and consequent short circuiting of turns of the coils.

The construction by which the projections 26 of the contact members 25 are spigotted into the recesses 24 of the discs 20, thereby securing the contact members 25 to the discs 20, causes the current in flowing from each coil 22 to the corresponding contact annulus 28 to pass radially inwards through the outer part of the discs 20 towards the centre-line of the contact, entering the contact member 25 at a radius which is less than the inner radius of the contact annulus 28.

This arrangement has the effect that the current in each segment of each contact member (that is to say, in each diametral plane) has a radial component which produces a tangential field, the tangential fields from the radial flow in the two contact members being in the same direction so as to reinforce one another. When an arc is struck between the contact annuli, at any circumferential point around the annuli, the tangential field reacts with the arc so as to move the arc radially outwards on to the arcing annuli. (This effect is described more particularly with reference to FIGURE 9.) Furthermore reaction with the radial magnetic field due to the coils 22 induces rapid spreading of the arc and its rotation around the periphery of the contacts. It will be appreciated that the radial and rotational movement of the arc is an electromagnetic effect in accordance with Fleming's Left Hand rule for conductors in a magnetic field. Spreading of the arc occurs, in addition to the movement of the arc, with rising currents and is manifested by an increase in the number, but not the size, of the cathode spots. Owing to the inherent mutual repulsion of the cathode spots, the area of the electrode involved in the arc process is enlarged.

Figure 4:
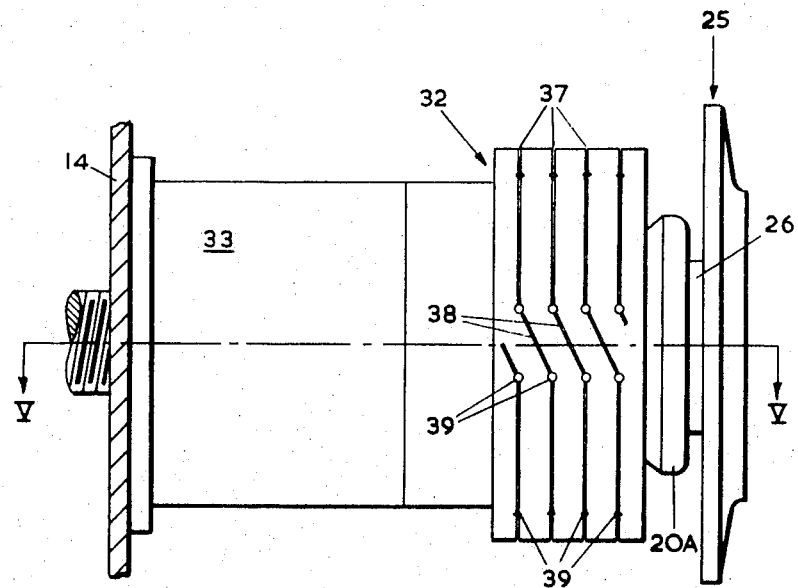
FIG. 4 illustrates on a larger scale a modified interrupter contact for use in the circuit interrupter of FIG. 1.
Figure 5:
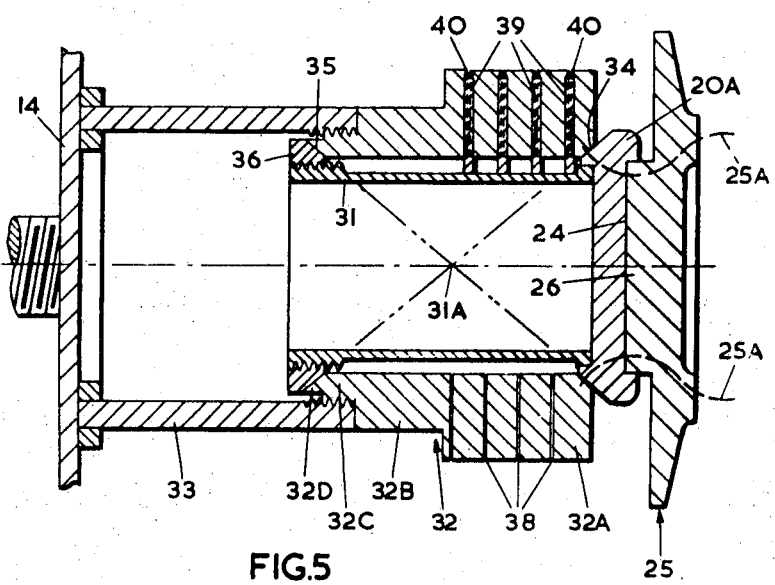
FIG. 5 is a sectional view of the modified interrupter contact on the line V—V of FIG. 4.

In a modification of the embodiment of FIGURES 1 to 3 the fixed contact may be constructed as shown in FIGURES 4 and 5 and like parts have been allocated the same reference numerals as in FIGURES 1 to 3. The circular projection 26 of the contact member 25 is secured in the recess 24 of a modified disc 20A of high-conductivity material, e.g. copper. A stainless steel tube 31 which carries the contact member is brazed into the disc 20A. The portion of the disc 20A surrounding the tube 31 is generally frusto-conical in form. The tube 31 is surrounded coaxially by a cylindrical sleeve 32 of high-conductivity material such as copper, the inside diameter of which is substantially constant and greater than the outside diameter of the tube 31. The outer wall of the sleeve 32 is stepped into four portions 32A, 32B, 32C, 32D each of substantially constant outside diameter. The portion 32A has the largest outside diameter and is located adjacent the disc 20A. The mouths formed by each end of the sleeve 32 have tapered peripheral surfaces 34, 35. The end of the tube 31 remote from the disc 20A is threaded on its outer wall and engaged by a generally frusto-conical annular stainless steel nut 36. The frusto-conical parts of the disc 20A and the annular nut 36 engage in the manner of spigots in the mouths at the ends of the sleeve 32 so as to bear on the complementary peripheral surfaces 34, 35 thereof.

Preferably in order to ensure accurate location of the sleeve 32 relative to the stainless steel tube 31 upon assembly, the imaginary apexes of the frusto-conical portions of the disc 20A and the annular nut 36 are congruent on the axis of the tube (that is, they meet at the same point 31A on the axis) so that the triangular sections of the imaginary conical projections of the frusto-conical portions in the plane of the section of FIGURE 4 will be formed by two straight lines, as shown chain-dotted in FIGURE 4.

Four circumferential slots 37 are machined at right angles to the axis of the contact so as to extend through the major part of the portion 32A and leave a small amount of the material of the sleeve 32 between their ends. Oblique intermediate slots 38, all along one side of the sleeve, interconnect opposed ends of adjacent main circumferential slots 37 so as to form a substantially helical conducting coil with stepped turns, the steps being defined by the oblique slots 38. The ends of the sleeve remain as continuous annuli.

The diameter of the second largest portion 32B of the sleeve 32, which is adjacent the portion 32A, is substantially the same as the outside diameter of a modified tubular conducting part 33 of high-conductivity material, such as copper, which is secured to the base plate 14. The end of the inside wall of the tubular conducting part 33 is threaded and engaged by an external thread on the portion 32C so that the step between the portions 32B and 32C rests upon the end of the tubular conducting part 33. The smallest diameter portion 32D is of substantially the same diameter as the outside diameter of the annular nut 36.

Alumina or glass ceramic rods 39 are inserted radially through the slots 37, 38. The diameter of the rods 39 is greater than the width of the slots 37, 38 and grooves are drilled at appropriate places to accommodate the rods 39. As shown in FIGURE 5, the rods 39 are pushed into the sleeve 32 until one end contacts the tube 31 and the other end is within the outside diameter of the portion 32A. The adjacent parts 40 of the material of the portion 32A are peened over the ends of the rods 39 remote from the tube 31 so as to retain the rods 39 in position. Care must be taken during the peening over operation to ensure that a short circuit is not formed by connecting up material on each side of the slot 37, 38. FIG. 4 shows that radial rods 39 are conveniently located at ends of the oblique intermediate slots 38 and at other suitable positions around the main circumferential slots 37.

It will be understood that in this modification the end of the tube 31 is not secured to the base plate 14. The ends of the tube 31 are clamped between the annular nut 36 and the disc 20A which serve as spigots engaging in complementary frusto-conical socket portions in the tubular sleeve member 32, whilst the sleeve 32 is supported on the tubular conducting part 33. However the tube 31 is a structural member which supports the contact member 25 and the disc 20A, thereby laterally aligning the contact annulus of the contact member 25 with the contact annulus of the movable contact and withstanding the compressive force exerted on the fixed contact upon closure, so as to prevent compression of the generally helical conducting coil, crushing of the radial rods 39 and consequent short circuiting of the stepped turns of the coil.

The radial rods 39 act as spacers which prevent adjacent turns of the generally helical conducting coil contacting each other under the action of magnetic field forces.

The current path through the disc 20A and contact member 25 is shown by the broken lines 25A.

A similar modification to the movable contact of the embodiment of FIGURES 1 to 3 may be employed, the only difference being the tubular conducting part 33 is mounted on the plate 14A rather than on the end plate 14.

Figure 6:
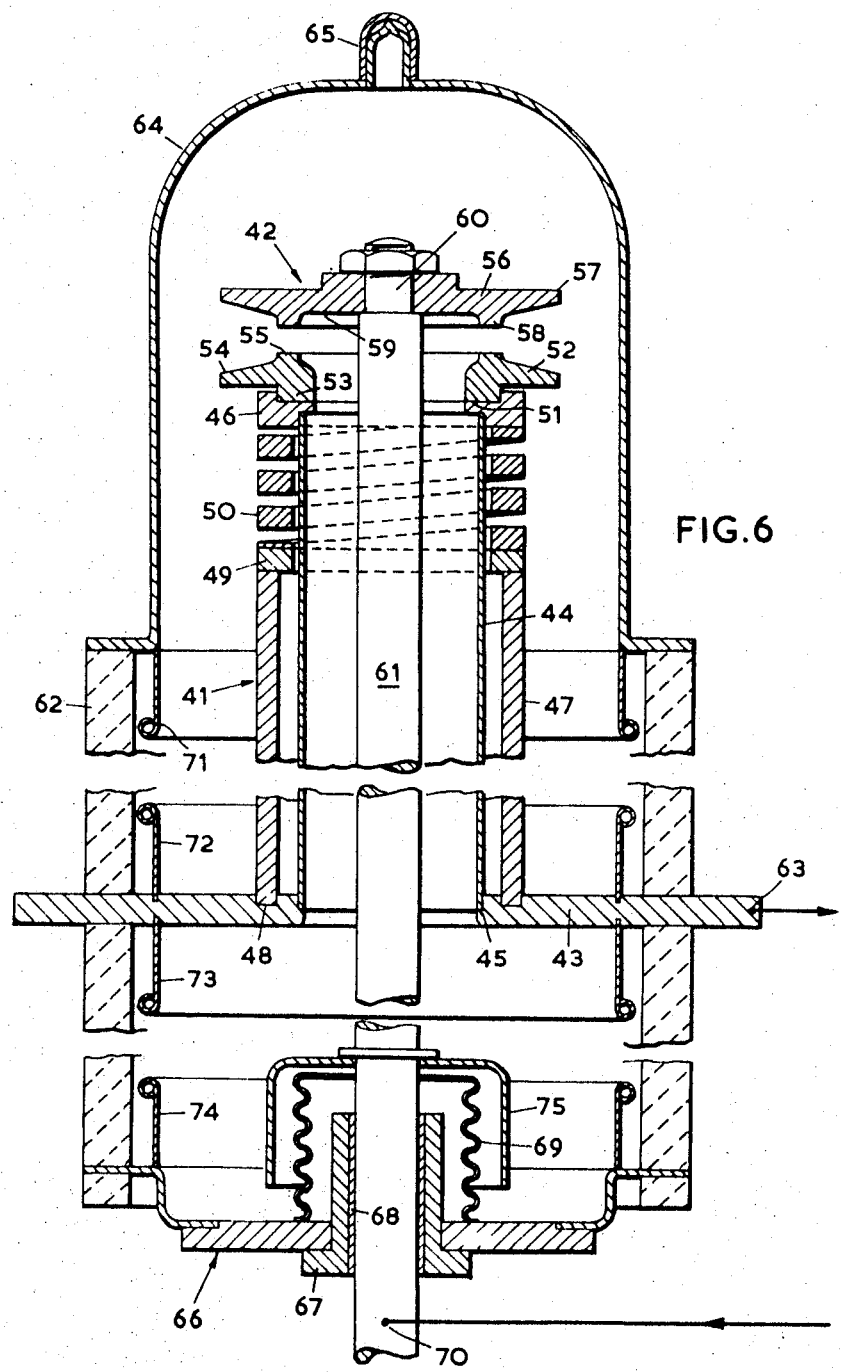
FIG. 6 is a sectional view of a second embodiment of a circuit interrupter in accordance with this invention.

Referring to FIGURE 6, there is illustrated a second embodiment of a vacuum circuit interrupter having a fixed contact 41 and a movable contact 42.

The fixed contact 41 is generally tubular and is mounted upon an annular supporting plate 43. The fixed contact 41 includes a tube 44, the inside diameter of which is substantially the same as the diameter of the central aperture of the annular supporting plate 43. The tube 44 is of a material of high mechanical strength and high electrical resistance and it rests upon an annular shoulder 45 provided in the inside wall of the annular supporting plate 43. The end of the tube 44 remote from the annular supporting plate 43 is spigotted into an annular disc 46. A second tube 47, the inside diameter of which is greater than the outside diameter of the tube 44 and whose length is substantially less than that of the tube 44, rests in an annular recess 48 provided in the annular supporting plate 43, so as to be spaced from and surround part of the tube 44. A ring 49, the inside diameter of which is less than the inside diameter of the second tube 47 but greater than the outside diameter of the tube 44 and whose outside diameter is substantially the same as that of the second tube 47, rests upon and is secured to the end of the second tube 47 remote from the annular supporting plate 43, so as to be spaced from the tube 44. A coil 50, the inside and outside diameters of which are substantially the same as those of the ring 49, bears between the ring 49 and the annular disc 46, so as to be spaced from the tube 44. The annular supporting plate 43, the second tube 47, the ring 49, the coil 50 and the annular disc 46 are all constructed of a high-conductivity metal, e.g. copper.

The side of the annular disc 46 remote from the coil 50 is provided with an annular shoulder 51, the outside diameter of which is substantially less than the mean diameter of the coil 50.

The annular contact member 52 of the fixed contact 41 is provided with an annular projection 53, the inside diameter of which is substantially the same as the inside diameter of the annular disc 46 and which spigots into the shoulder 51. The annular contact member 52 is also provided with a flange 54 which is spaced away from the adjacent part of the annular disc 46 and with a contact annulus 55, the inside diameter of which is greater than the inside diameter of the annular disc 46. The inside wall of the annular contact member 52 flares inwardly from the inside diameter of the contact annulus 55 to the major portion of constant inside diameter, which is substantially the same as the inside diameter of the annular disc 46.

The contact member 56 of the movable contact 42 is provided with a flange 57 and a contact annulus 58, which are respectively similar to the flange 54 and the contact annulus 55 of the annular contact member 52.

The contact annulus 58 is of the same diameter as the contact annulus 55, is on the side of the contact member 56 adjacent the annular contact member 52 so as to cooperate with the contact annulus 55, and surrounds a central depression 59. The contact member 56 is drilled along its axis to receive the threaded end 60 of a rod 61, whereby it is bolted to the end of the rod 61. The rod 61 extends through the centre of the generally tubular fixed contact 41 through the central aperture of the annular supporting plate 43 and is connected to a suitable actuator, which is located externally of the vacuum circuit interrupter and which causes the movable contact 42 to make or break contact with the fixed contact 41.

The annular supporting plate 43 protrudes through and is in sealing engagement with a tubular insulator 62. The portion of the annular supporting plate 43 protruding through the tubular insulator 62, which is consequently outside the vacuum circuit interrupter enclosure, provides one terminal 63 of the vacuum circuit interrupter for connection to an external A.C. circuit.

The end of the tubular insulator 62 adjacent the contact member 56 and the annular contact member 52 is in sealing engagement with a suitable metallic vacuum enclosure member 64, which surrounds the contact member 56 and the annular contact member 52. The metallic vacuum enclosure member 64 is provided with means 65 for evacuating and sealing off the interior of the circuit interrupter.

The vacuum circuit interrupter enclosure is completed by a metallic end plate assembly, generally indicated at 66, which is in sealing engagement with the end of the tubular insulator 62 remote from the metallic vacuum enclosure member 64.

The metallic end plate assembly 66 includes a bushing 67, which carries a sleeve bearing 68. The rod 61 slides within the sleeve bearing 68. The bushing 67 and the sleeve bearing 68 act as a guide to the rod 61, reducing any tendency of the rod 61 to move laterally and ensuring that the contact annuli 55 and 58 mate when contact is made.

A bellows 69 is provided between the rod 61 and the metallic end plate assembly 66, within the vacuum circuit interrupter and surrounding the bushing 67 and sleeve bearing 68, thereby sealing off the bushing 67 and sleeve bearing 68 from the evacuated enclosure.

The rod 61 carries a terminal 70 externally of the vacuum circuit interrupter enclosure for connection to the external A.C. circuit.

Tubular shields 71, 72, 73 and 74 are attached to the annular supporting plate 43, the metallic vacuum enclosure member 64 and the metallic end plate assembly 66 to protect the tubular insulator 62 against the effects of arcs drawn between the contacts and to reduce field stress at the seals. A cup shaped shield 75 is carried by the rod 61 and surrounds the bellows 69 so as to protect the bellows 69 from the effects of arcs drawn between the contacts. The use of such shields is well known in the art.

Figure 7:
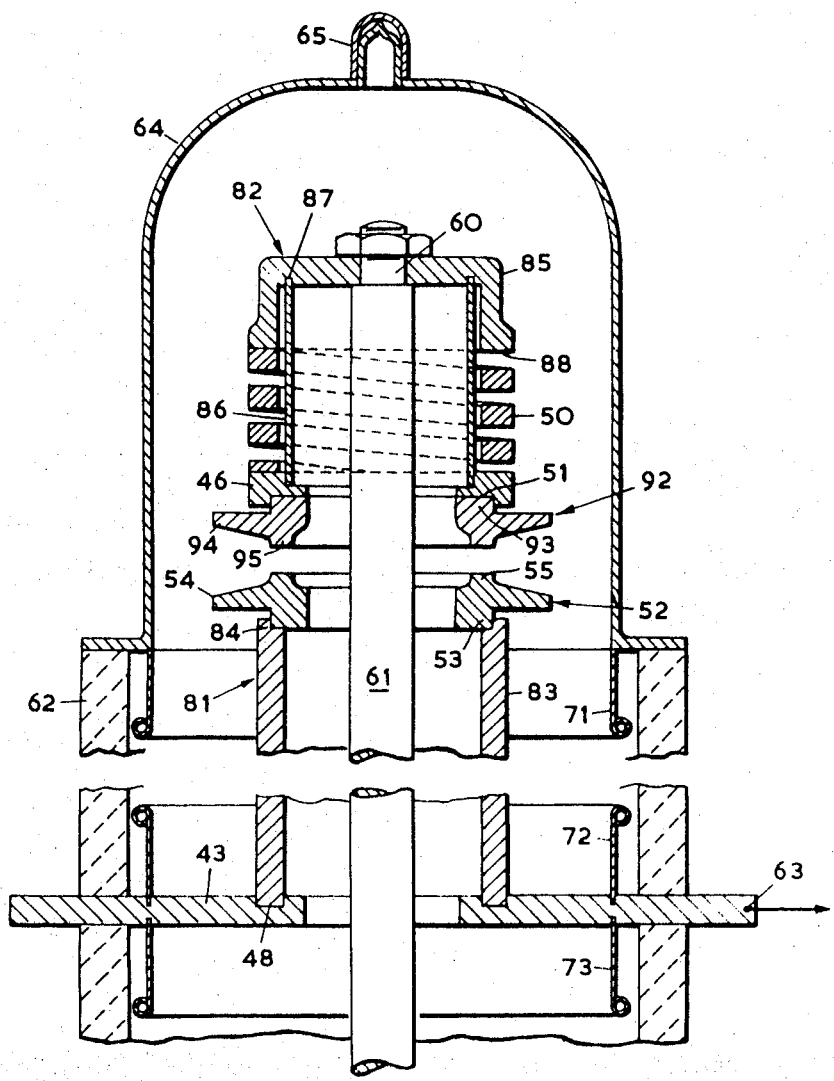
FIG. 7 is a sectional view of part of a circuit interrupter incorporating a modification of the embodiment of FIGURE 6.

FIG. 7 illustrates part of a vacuum circuit interrupter having a fixed contact 81 and a movable contact 82, the construction of which is similar to that of the vacuum circuit interrupter shown in FIG. 6 and wherein like parts are given like reference numerals. The principal modification to the vacuum circuit interrupter of FIG. 6 illustrated in FIG. 7 is the inclusion of the coil 50 in the movable contact 82 rather than the fixed contact 81.

The fixed contact 81 is generally tubular and includes a tube 83, which rests in the annular recess 48 of the annular supporting plate 43. The annular projection 53 of the annular contact member 52 is spigotted into a shoulder 34, provided in the end of the tube 83 remote from the annular supporting plate 43, so that the flange 54 is spaced from the tube 83.

The movable contact 82 includes a cup-shaped end member 85, which is drilled along its axis to receive the threaded end 60 of the rod 61, whereby it is bolted to the end of the rod 61. A tube 86, similar to the tube 44, surrounds and is spaced from the rod 61 and is spigotted into an annular recess 87 provided in the inside base surface of the cup-shaped end member 85. The inside diameter of the cup-shaped end member 85 is greater than the outside diameter of the tube 86 and is spaced therefrom. The end of the tube 86 remote from the cup-shaped end member 85 is spigotted into the annular disc 46, as is the like tube 44 in FIG. 6. It will be appreciated that the annular disc 46 is similar to the annular disc 46 of FIG. 6 but is inverted. The rim of the cup-shaped end member 85 is formed as a bearing surface 88, the outside diameter of which is substantially the same as the outside diameter of the coil 50 and of the annular disc 46, and the inside diameter of which is substantially the same as the inside diameter of the coil 50. The coil 50 bears between the bearing surface 88 and the annular disc 46, so as to be spaced from the tube 86. An annular contact member 92, similar to the annular contact member 52 has an annular projection 93, which is spigotted into the annular shoulder 51 of the annular disc 46, a flange 94 and a contact annulus 95, respectively similar to the annular projection 53, the flange 54 and the contact annulus 55.

The rod 61 extends from the cup-shaped end member 85, through the central aperture of the movable contact 82, formed by the tube 86, the annular disc 46 and the annular contact member 92, through the generally tubular fixed contact 81 and through the central aperture of the annular supporting plate 43. The remainder of the vacuum circuit interrupter is substantially the same as the vacuum circuit interrupter hereinbefore described with reference to FIGURE 6.

It will be appreciated that the tube 83 and the cup-shaped end member 85 are also constructed of a high-conductivity metal, e.g. copper, whereas the tube 86, like the tube 44, is of a material of a high mechanical strength and a high electrical resistance, preferably stainless steel.

Figure 8:
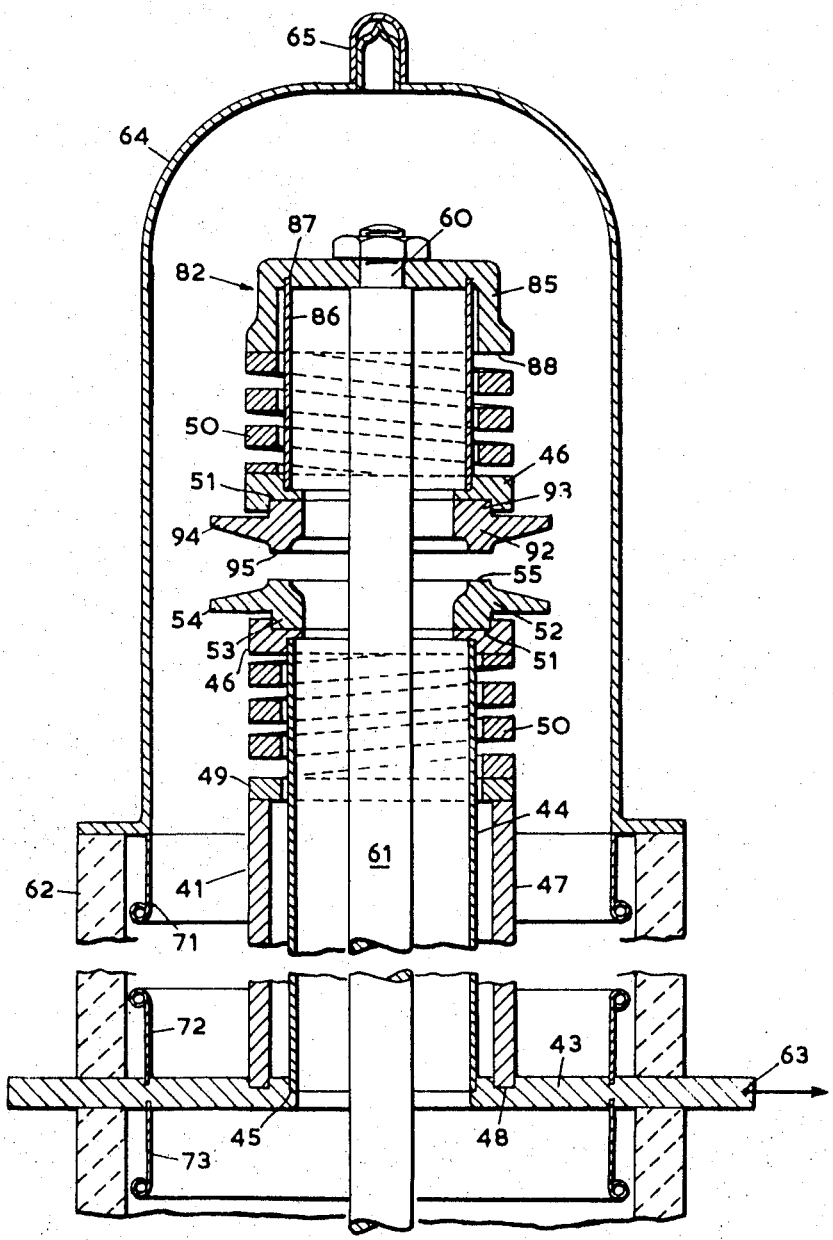
FIG. 8 is a sectional view of part of a circuit interrupter incorporating a further modification of the embodiment of FIGURE 6.

The vacuum circuit-interrupter, part of which is illustrated in FIGURE 8, differs from those shown in FIGURES 6 and 7 in that both the fixed and the movable contacts include coils 50. Effectively, the vacuum circuit interrupter of FIGURE 8 includes the combination of the fixed contact 41, as hereinbefore described with reference to FIGURE 6, and the movable contact 82, as hereinbefore described with reference to FIGURE 7. It should be appreciated that in this embodiment the coils 50 are wound in opposite directions to each other so as to produce mutually reinforcing radial fields between the contacts. The remainder of the vacuum circuit interrupter is substantially the same as the vacuum circuit interrupter hereinbefore described with reference to FIGURE 6.

It will be readily apparent that although having a different cross-section as shown in FIGURE 6, FIGURE 7, or FIGURE 8, the basic construction of the annular contact members 52, 56 or 92 may be formed in a similar manner to that of the contact member 25 described with reference to FIGURE 2 or FIGURE 3.

In operation of the embodiments of vacuum circuit interrupter described with reference to FIGURES 6, 7 or 8, the movable contact 42 or 82 is moved, by means of the actuator connected to the rod 61, to bring the contact member 56 or 92 and the annular contact member 52 together with their contact annuli 58 or 95 and 55 abutting. With the contacts 41 or 81 and 42 or 82 closed, current flows along a path including the terminal 70, the rod 61 and the movable contact 42 of 82. Considering the flow direction shown, the current flow to the contact annulus 58 of the movable contact 56 or, in the movable contact 82, it flows through the cup-shaped end member 85, the coil 50, the annular disc 46 and the annular contact member 92 to the contact annulus 95 thereof. The current then flows from the movable contact 42 or 82 to the annular contact member 52, by way of the contact annuli 55 and 58 or 95, wherefrom it flows through the annular disc 46, the coil 50, the ring 49 and the second tube 47, in the embodiments of FIGURES 6 and 8, or through the tube 83 in the embodiment of FIGURE 7, to the annular supporting plate 43, which carries the terminal 63.

Figure 9:
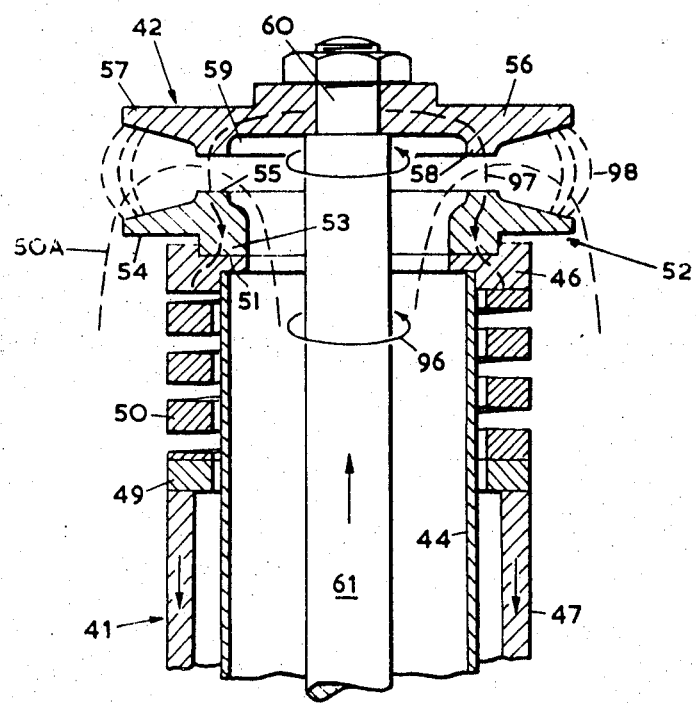
FIG. 9 is a sectional view of part of a circuit interrupter similar to that shown in FIG. 6.

The current flowing in the coil or coils 50 produces a magnetic field, part of which is shown by the dotted line 50A in FIGURE 9. Between the contact annuli this field is radial (the directions of the fields from the two coils 50 in FIGURE 8 being the same where they are radial, so that they reinforce one another) and the effect of this is to produce a tangential force on an arc struck between the contact annuli, or between the arcing annuli, so as to rotate the arc about the axis of the contacts.

The construction by which the annular contact member 52 or 92 is secured to the annular disc 46, or to the tube 83, through the annular projection 53 or 93 engaging the shoulder 51 or 84, causes the current to flow along a mean path extending somewhat radially inwards from the contact annulus. The radial component of flow produces a tangential magnetic field (at any particular circumferential point) which produces an outward radial force on any arc struck between the contact annuli, so as to move the arc to between the arcing surfaces. The local current loop which produces this effect is shown by the dotted line 97 in FIGURE 9. It will be appreciated that a local current loop in that form is present in any diametral section. In other words, an arc struck between the contact annuli at any circumferential point will be moved radially outwards by the field produced by the local current loop, after which it will be rotated by the field produced by the coil or coils 50.

The tangential field produced by current flow in the movable contact member 56 is more significant than that produced by the current in the fixed contact 52 because it has a more pronounced radial component. Nevertheless such radial current as there is in the member 52 does assist in producing a tangential field, and this field may be strengthened by deepening the external circumferential groove between the member 52 and the adjacent annular disc 46 or by forming the member 52 and the adjacent disc as in FIGURE 1.

The flow of current along the rod 61 produces a circular magnetic field 96 in the space surrounding the rod, as shown in FIGURE 9. This circular field reinforces the field produced by the local current loop.

Upon separation of the contacts by means of the actuator, for example under conditions of high fault current, an arc, which is part of the local current loop 97, is drawn between the contact annuli 55 and 58 or 95. As explained above, the magnetic field associated with the local current loop 97 in combination with the circular magnetic field 96 produces a radial force which acts upon the arc so as to produce outward motion of the arc from the position between the contact annuli 55 and 58 or 95 to a position between the flanges 54 and 57 or 94 as shown at 98. Likewise the radial magnetic field component produced in the active region of the contacts by the current flowing in the coil or coils 50 reacts with the arc 98 to produce rapid spreading and continuous rotation of the arc around the periphery of the contacts.

The tubes 44 or 86 are structural members which support the contact members 52 or 92 and the annular discs 46, thereby aligning the contact annuli 55 and 58 or 95 with each other so that they co-operate when the contacts 41 or 81 and 42 or 82 are closed, and which withstand the compressive force exerted on the respective contact upon closure, thereby preventing compression of the coils 50 and consequent short circuiting of turns of the coils.

Any one of the vacuum circuit interrupters hereinbefore described with reference to FIGURES 6 to 9 may be modified to incorporate the modifications described with reference to FIGURES 4 and 5. Furthermore any of the vacuum circuit interrupters described with reference to FIGURES 1, 6, 7, 8 or 9 may incorporate radial rods as interturn spacers as described with reference to FIGURES 4 and 5.

Preferably stainless steels of the type which includes approximately 18 percent of chromium and 8 percent of nickel are employed for the tubes 21, 31, 44 or 86. Such stainless steels have an electrical resistivity of 70–75 micro-ohm cm. Suitable stainless steels of this general type are EN58B (titanium stabilised) or EN58F (niobium stabilised). It will be appreciated that the stainless steel tubes are electrically in parallel with the generally helical conducting coils and consequently some current will flow through the stainless steel tubes. The relationship between the resistance of the stainless steel tube and the impedance of the coil (that is to say at power system frequencies) in general should be such that at least one third and preferably two thirds of the total current flowing through the circuit interrupter flows through the coil. It will be appreciated that it is not essential for the structural tubes 21, 31, 44 or 86 to be formed of stainless steel, nor is it essential for them to be formed of an electrically conducting material. Any suitable material may be employed providing the required mechanical strength is available and providing that a sufficient current can flow through the coils.

It is not essential for the contact annuli and the arcing annuli to be formed on the same contact member as has been hereinbefore described. Fixed annular arcing electrodes, forming spaced apart arcing surfaces, may be mounted on structural tubes surrounded by generally helical conducting coils in accordance with the invention, the pair of fixed annular arcing electrodes coaxially surrounding a pair of relatively movable load current carrying contacts.

In any of the examples described above, the fixed contact may be spring mounted so as to yield slightly when engaged by the movable contact. This reduces the tendency for the movable contact to bounce back slightly on coming into engagement with the fixed contact. Moreover it facilitates rapid separation of the contacts because it enables the movable contact to be accelerated before actually parting from the fixed contact; in other words the relative velocity of the contacts is greater immediately after the actual moment of separation.

The interior of the circuit interrupter is preferably maintained at a high vacuum, e.g. of the order of 10⁻⁶ mm. Hg, or better.

We claim:
1. A vacuum circuit interrupter comprising an evacuated enclosure and a pair of relatively movable contacts within said evacuated enclosure, and including a generally circular conducting part which is associated with a first of said pair of relatively movable contacts, a structural tube, said generally circular conducting part being mounted coaxially on one end of said structural tube, a substantially helical conducting coil coaxially surrounding said structural tube, a terminal outside said evacuated enclosure electrically connected to said first contact, said generally circular conducting part being electrically connected to said terminal through said substantially helical conducting coil whereby the magnetic field produced by current flowing in said substantially helical conducting coil reacts with an arc struck from said generally circular conducting part after separation of said pair of relatively movable contacts to cause rotation of the arc around the axis of said generally circular conducting part, and said structural tube directly supports said generally circular conducting part and indirectly supports said substantially helical conducting coil through said generally circular conducting part against the action of forces exerted thereon during operation.

2. A vacuum circuit interrupter as claimed in claim 1, wherein an annular contact surface is formed on each of said pair of relatively movable contacts and wherein a first annular arcing surface is formed on said generally circular conducting part concentrically surrounding said annular contact surface of said first contact, and wherein a second annular arcing surface concentrically surrounds said annular contact surface of the second of said pair of relatively movable contacts, and including means for producing a second magnetic field which reacts with an arc struck between said annular contact surfaces on separation of the contacts to move the arc radially outwards to between said first and second annular arcing surfaces.

3. A vacuum circuit interrupter as claimed in claim 2, wherein said means for producing the second magnetic field comprises means defining a current path in each of said relatively movable contacts having a radial component adjacent to said annular contact surfaces, substantially all the way around the inner peripheries of said annular contact surfaces, whereby the second magnetic field reacts on an arc struck at any circumferential point between said annular contact surfaces so as to move the arc radially outwards to between said annular arcing surfaces.

4. A vacuum circuit interrupter as claimed in claim 3, in which said conducting part serves as said first contact, and wherein the mean diameter of said helical conducting coil is greater than the outside diameter of the annular contact surface of said first contact.

5. A vacuum circuit interrupter as claimed in claim 1, wherein the fixed contact is tubular and the movable contact is carried by an actuating rod which extends through the fixed contact.

6. A vacuum circuit interrupter according to claim 1, in which the substantially helical conducting coil consists of a sleeve having means defining circumferential slots joined by oblique slots to form stepped turns.

7. A vacuum circuit interrupter according to claim 6 in which each turn of the coil consists of a nearly complete ring portion joined to the adjacent turn by an oblique step portion, the step portions all being along one side of the coil.

8. A vacuum circuit interrupter comprising an evacuated enclosure and a pair of relatively movable contacts within said evacuated enclosure, and including a generally circular conducting part which is associated with a first of said pair of relatively movable contacts, a structural tube, said generally circular conducting part being mounted coaxially on one end of said structural tube, a substantially helical conducting coil coaxially surrounding said structural tube and consisting of a sleeve having means defining circumferential slots joined by oblique slots to form stepped turns, each turn of the coil consisting of a nearly complete ring portion joined to an adjacent turn by an oblique step portion, the step portions all being along one side of the coil, the substantially helical conducting coil being held coaxially with respect to the structural tube by means of two spigots secured respectively to the ends of the tube, the spigots having frusto-conical outer surfaces converging towards one another and engaging in complementary sockets in the ends of the coil a terminal outside said evacuated enclosure electrically connected to said first contact, said generally circular conducting part being electrically connected to said terminal through said substantially helical conducting coil whereby the magnetic field produced by current flowing in said substantially helical conducting coil reacts with an arc struck from said generally circular conducting part after separation of said pair of relatively movable contacts to cause rotation of the arc around the axis of said generally circular conducting part.

9. A vacuum circuit interrupter according to claim 8 in which the cone angles of the frusto-conical spigots are such that the imaginary apexes of the cones are substantially congruent on the axis of the tube.

10. A vacuum circuit interrupter according to claim 8, in which the sleeve forming the coil is slotted along only part of its length and in which the unslotted part extends beyond the end of the structural tube remote from the annular or generally circular conducting part to an anchorage on the wall of the envelope of the circuit interrupter, or on a movable member connected to an actuating rod, the tube being thus carried by the unslotted part of the sleeve.

11. A vacuum circuit interrupter according to claim 10 in which the spigot at the end of the structural tube remote from the annular or generally circular conducting part is screwed onto the tube.

12. A vacuum circuit interrupter according to claim 1, in which the structural tube is of stainless steel.

13. A vacuum circuit interrupter according to claim 1, in which interturn spacers of insulating material are provided between adjacent turns of the substantially helical conducting coil.

14. A vacuum circuit interrupter according to claim 13 in which the interturn spacers consist of radial rods which extend from the periphery of the structural tube between adjacent turns of the substantially helical conducting coil, and which are held in position by portions of the adjacent turns of the coil peened over the outer ends of the rods.

15. A vacuum circuit interrupter according to claim 6, in which interturn spacers of insulating material are provided between adjacent turns of the susbstantially helical conducting coil and are situated at the ends of each oblique slot and at suitable locations around the circumferential slots.

16. A vacuum circuit interrupter according to claim 1, including a second generally circular conducting part which is associated with the second contact, and which is mounted coaxially on one end of a second structural tube, the second structural tube being surrounded by a second substantially helical conducting coil which connects the second conducting part electrically to a second terminal outside the evacuated enclosure, the second structural tube directly supporting the second generally circular conducting part and indirectly supporting the second substantially helical conducting coil through the second generally circular conducting part against the action of forces exerted thereon during operation, the second helical conducting coil being wound in the opposite direction to the first mentioned helical conducting coil.

17. A vacuum circuit interrupter as claimed in claim 16, wherein the contacts have annular contact surfaces, said first-mentioned generally circular conducting part is formed with a first annular arcing surface concentrically surrounding the annular contact surface of the first contact, and said second generally circular conducting part is formed with a second annular arcing surface concentrically surrounding the annular contact surface of the second contact and including means forming a magnetic field which reacts with an arc struck between the annular contact surfaces on separation of the contacts to move the arc radially outwards to between the first and second annular arcing surfaces.

18. A vacuum circuit interrupter comprising an evacuated enclosure; a pair of relatively movable contacts within said evacuated enclosure; an annular contact surface formed on each of said pair of relatively movable contacts; a generally circular conducting part associated with a first of said pair of relatively movable contacts; a first annular arcing surface formed on said generally circular conducting part and concentrically surrounding said annular contact surface of said first contact; a second annular arcing surface concentrically surrounding said annular contact surface of the second of said pair of relatively movable contacts; a substantially helical conducting coil consisting of sleeve means mounted coaxially with said generally circular conducting part, said sleeve means having means defining circumferential slots and oblique slots, said oblique slots joining adjacent circumferential slots to form stepped turns of said substantially helical conducting coil; a terminal outside said evacuated enclosure electrically connected to said first contact; said generally circular conducting part being electrically connected to said terminal through said substantially helical conducting coil; and including means for producing a magnetic field which reacts with an arc struck between said annular contact surfaces on separation of the contacts to move the arc radially outwards to between said first and second annular arcing surfaces whereupon the magnetic field produced by current flowing in said substantially helical conducting coil reacts with the arc to cause rotation of the arc around the axis of the annular arcing surfaces.

19. A vacuum circuit interrupter according to claim 18, wherein the end portions of said sleeve means consist of continuous unbroken annular end pieces.

20. A vacuum circuit interrupter comprising an evacuated enclosure and a pair of relatively movable contacts within said evacuated enclosure, and including a generally circular conducting part which is associated with a first of said pair of relatively movable contacts, a structural tube, said generally circular conducting part being mounted coaxially on one end of said structural tube; first and second spigot means secured respectively to the two ends of said structural tube; frusto-conical outer surfaces formed on each of said first and second spigot means, said frusto-conical surfaces converging towards one another; substantially helical conducting coil means surrounding said structural tube; frusto-conical sockets formed at the ends of said substantially helical conducting coil means, each socket being engaged by said frusto-conical surface of a respective one of said first and second spigot means so as to hold said substantially helical conducting coil coaxially with said structural tube; a terminal outside said evacuated enclosure electrically connected to said first contact, said generally circular conducting part being electrically connected to said terminal through said substantially helical conducting coil means whereby the magnetic field produced by current flowing in said substantially helical conducting coil means reacts with an arc struck from said generally circular conducting part after separation of said pair of relatively movable contacts to cause rotation of the arc around the axis of said generally circular conducting part.

21. A vacuum circuit interrupter comprising an evacuated enclosure; a pair of relatively movable contacts within said evacuated enclosure; axially movable rod means carrying one of said pair of relatively movable contacts; an annular contact surface formed on each of said pair of relatively movable contacts; a pair of generally circular conducting parts, each generally circular conducting part being associated with a respective contact; an annular arcing surface formed on each said generally circular conducting part and concentrically surrounding said annular contact surface of said respective contact; a pair of structural tubes, each generally circular conducting part being mounted coaxially on one end of one of said structural tubes; a pair of substantially helical conducting coils wound in opposite directions to each other, each substantially helical conducting coil coaxially surrounding a respective structural tube; a pair of terminals outside said evacuated enclosure each electrically connected to a corresponding contact, each generally circular conducting part being electrically connected to the corresponding terminal through the respective substantially helical conducting coil; and including means defining current paths in each of said relatively movable contacts having radial components adjacent to said annular contact surfaces, substantially all the way around the inner peripheries of said annular contact surfaces, whereby a magnetic field is produced which reacts with an arc struck at any circumferential point between said annular contact surfaces on separation of said relative movable contacts so as to move the arc radially outwards to between said annular arcing surfaces whereupon the magnetic fields produced by current flowing in said substantially helical conducting coils react with the arc to cause rotation of the arc around the axis of the annular arcing surfaces.

References Cited

UNITED STATES PATENTS

| 3,026,394 | 3/1962 | Jennings. |
| 3,244,843 | 4/1966 | Ross _____ 200—147 X |
| 3,250,880 | 5/1966 | Jennings. |
| 3,366,762 | 1/1968 | Smith. |

ROBERT S. MACON, Primary Examiner

U.S. Cl. X.R.

200—147, 166